(12) United States Patent
Warnecke et al.

(10) Patent No.: US 7,823,886 B2
(45) Date of Patent: Nov. 2, 2010

(54) SEAL ASSEMBLY

(75) Inventors: Frank Warnecke, Karlsruhe (DE);
Xiaoling Jin, Farmington Hills, MI (US)

(73) Assignee: Federal Mogul Sealing Systems Bretten GmbH, Burscheid (DE)

( * ) Notice: Subject to any disclaimer, the term of this patent is extended or adjusted under 35 U.S.C. 154(b) by 1210 days.

(21) Appl. No.: 10/578,987

(22) PCT Filed: Nov. 5, 2004

(86) PCT No.: PCT/DE2004/002450

§ 371 (c)(1),
(2), (4) Date: May 11, 2006

(87) PCT Pub. No.: WO2005/047740

PCT Pub. Date: May 26, 2005

(65) Prior Publication Data
US 2007/0138750 A1 Jun. 21, 2007

(30) Foreign Application Priority Data
Nov. 11, 2003 (DE) .......................... 103 52 674

(51) Int. Cl.
*F16J 15/02* (2006.01)
(52) U.S. Cl. ........................ 277/551; 277/572
(58) Field of Classification Search ............ 277/551, 277/572, 630, 637, 609
See application file for complete search history.

(56) References Cited

U.S. PATENT DOCUMENTS

| 2,446,243 | A |   | 8/1948 | Reynolds |
|---|---|---|---|---|
| 2,681,324 | A |   | 6/1954 | Hochberg |
| 2,889,163 | A |   | 6/1959 | Stephens et al. |
| 3,695,044 | A | * | 10/1972 | Hoshino et al. ............ 405/152 |
| 3,785,856 | A | * | 1/1974 | Gotoh ........................ 277/571 |
| 3,814,156 | A |   | 6/1974 | Bachmann et al. |
| 6,007,069 | A |   | 12/1999 | Sadowski et al. |

FOREIGN PATENT DOCUMENTS

| DE | 19 57 051 A1 | 6/1971 |
|---|---|---|
| DE | 2626484 | 12/1977 |
| DE | 7816435 U1 | 9/1979 |
| DE | 29 18 787 A1 | 11/1980 |
| DE | 4018216 | 12/1991 |
| DE | 3883026 | 2/1994 |
| EP | 1211425 A | 6/2002 |
| JP | 02107870 | 4/1990 |
| JP | 02155980 | 6/1990 |

\* cited by examiner

*Primary Examiner*—Vishal Patel
(74) *Attorney, Agent, or Firm*—Robert L. Stearns; Dickinson Wright, PLLC

(57) ABSTRACT

The invention relates to a sealing element at least comprising a housing area, at least one dynamically active sealing area and at least one statically active sealing area which at least partially interacts with the housing area. The invention is characterized in that the static sealing area is at least partially laminated with a hardenable material containing a predetermined number of friction-reducing elements.

10 Claims, 1 Drawing Sheet

SEAL ASSEMBLY

BACKGROUND OF THE INVENTION

1. Technical Field

The invention concerns a sealing element comprising at least one housing area, at least one dynamically active sealing area and at least one statically functioning sealing area which at least partially interacts with the housing area.

2. Related Art

The DE-A 40 18 216 introduces a wave seal containing a lip seal ring made of polytetrafluorethylene or another related material, with a radial hip forming a lip seal as well as an axial hip on the outer perimeter. The wave seal contains a housing having a static seal area, which is composed of sealing lacquer, in the area of the receptacle aperture.

A wave seal is seen in U.S. Pat. No. 2,889,163 having a housing area, a dynamic seal area, as well as a static seal area. The static seal area is planned to be in the radial external perimeter of the housing area, and is formed as a layering of minimal radial thickness. The layering is composed of thermoplastic material such as acrylic, vinyl, phenol or similar materials.

It is generally understood that seal elements having a static seal area are themselves to be provided by various elastomers having varying profile shapes.

The fundamental problems of the state-of-the-art are essentially founded on the reduction of installation effort through use of thinner friction surface layers, but these have the drawback that they also reduce the necessary functional strength under operational conditions, so that in suboptimal cases the seal element may move out of its receptacle mounting.

Static seals on the basis of elastomers are frequently difficult to implement due to high installation and remount effort required.

SUMMARY OF THE INVENTION AND ADVANTAGES

This invention addresses the task of furthering the work in this business area of seal elements in such a manner that installation processes will be simpler, and exhibit sufficient staying power under operational conditions.

This requirement is addressed by the static seal area being at least partially covered in a specified proportion of friction-reducing elements and hardenable materials.

Installation effort can be reduced as a result of the friction-reducing properties of installing elements in hardenable materials The advantageous effect under temperature influence of hardenable covering on the static seal area take effect after initial operation of the seal element, increasing the essential staying power, so that movement of a seal element out of its assigned receptacle mount can surely be avoided.

It is advantageous when this material is also a glue, such as polymeric material. Polyurethane and polyacrylate are suitable here.

PTFE or similar material can be used here as friction-reducing material for elements.

A preferred composition of hardenable materials is provided as follow:

| | |
|---|---|
| Acrylic polymer | 5–10% |
| PTFE | 0–10% |
| Water | 65–95% |

One further thought relative to the invention is that the seal element be formed of a radial wave seal ring, with a perimeter surface, specifically the external perimeter surface, is typically formed of elastomer material as a static seal area. The static seal area can be, for example, also be designed in a profiled form, where the cover includes at least the tip area of the profile.

Besides radial wave seal rings, the invention can also be applied for axial sliding seal rings with corresponding static seal areas, but also be used in LAUFWERK seals, insofar as these are equipped with appropriately formed housing components, having assigned static seal areas.

The advantageous installation of layering on the elastomer interior and/or exterior perimeter of the radial wave seal ring increases the staying power of the radial wave seal ring in the area of the receptacle aperture, so that higher operational security level can be achieved over the useful operational life of the seal element. Beyond that the installation effort is significantly reduced, which is of benefit where multiple installations are required.

As previously stated, increases in the staying power may be realized through reaction of the layering under influence of temperature increases in operational conditions. It is also conceivable that a layering material, specifically a glue, may be used where the cold temperature is affected by the installation process, resulting in hardening from the friction heat generated during installation.

THE DRAWINGS

The invention object is represented in an execution example in a drawing, and is described as follows.

DETAILED DESCRIPTION

Figure 1:
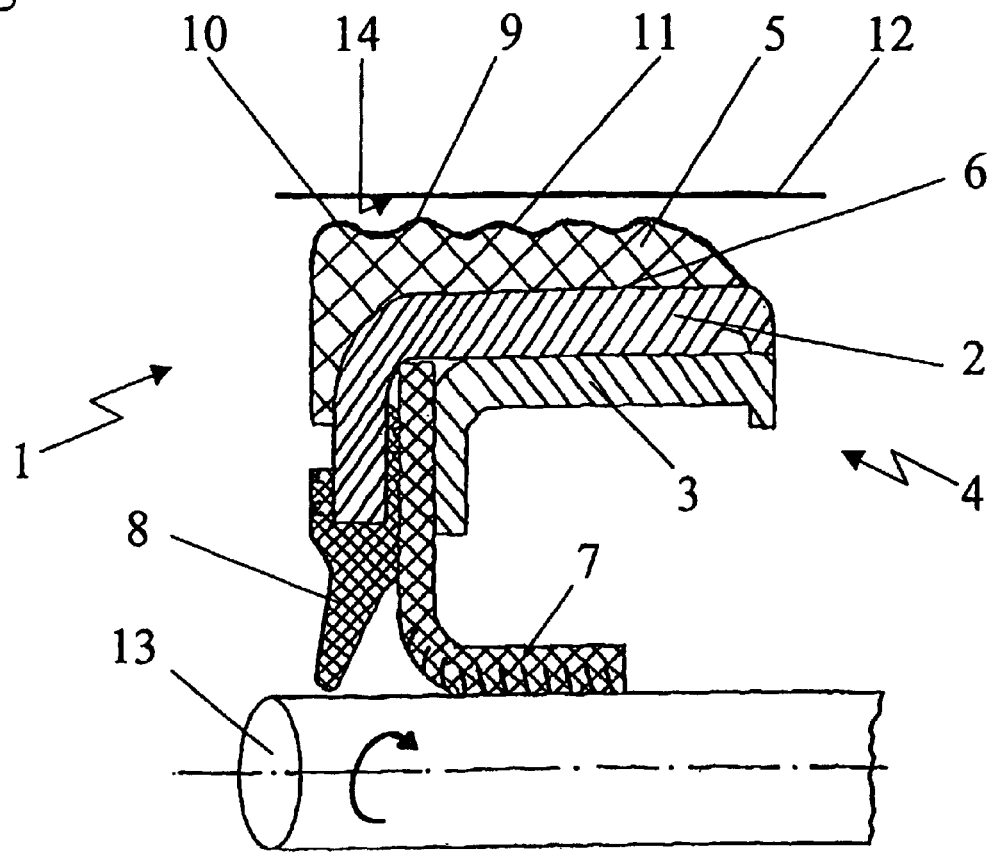
FIG. 1 illustrates a radial wave seal ring.

FIG. 1 shows a radial wave ring seal 1 having a housing area 4 provided by two sheet metal bodies 2, 3, a static seal area 5 in the form of an elastomer layer on the external surface 6 of the sheet metal body 2, as well as a dynamic seal area 7, made out of PTFE, for example, working in relation to the supplemental seal lip 8 made up of the elastomer material used for the static seal area 5. The static seal area 5 includes wave profile 9 in this example, wherein the external perimeter 10 of the wave profile 9 has a covering 11, which in this example is formed by a glue material that is hardenable by the effect of temperature. The glue material should consist of this composition for purposes of the example: 10% acrylic polymer, 5% PTFE and 85% water. The static seal area is to be mounted in the housing area 12, which is only indicated, and not depicted, while the dynamic seal area 7 and the rotating wave area 13 have a functional work relationship to each other. Given the proportional utilization of PTFE within covering area 11, an easier installation of the radial wave seal ring 1 into the receptacle aperture 12 can be achieved. Under operational conditions, when the environmental temperature of the receptacle aperture 12 increases, the glue material will harden, resulting in at least a partial connection of the perimeter surface area 14 with the receptacle aperture 12, resulting in increased staying power.

Along with greater ease of installation, brought about by use of friction-reducing elements, a not insubstantial increase in the staying power is brought about, so that movement of the radial wave seal ring 1 out of the receptacle aperture 12 can surely be inhibited.

Figure 2:
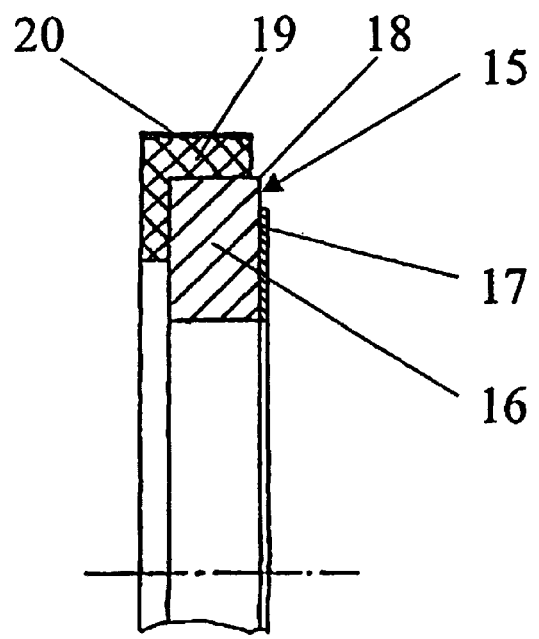
FIG. 2 illustrates a partial view of a sliding ring seal.

FIG. 2 depicts a partial view of an axial sliding ring seal 15. That item contains a sliding ring 16 with a dynamic sliding surface 17, an external surface area comprising a housing area for receiving a static seal area 19 made of an elastomer material. The static seal area 19 works in conjunction with a receptacle aperture that is not depicted, and is coated with a covering material 20 made of hardenable glue material to make installation easier, that covering material has the same or similar properties as covering area 11 in accordance with FIG. 1.

The invention claimed is:

1. A seal element comprising:
   a metal body having an external surface,
   a static seal portion of elastomer affixed to said external surface of said metal body,
   a dynamic seal portion at a second surface of said metal body different from said external surface,
   a supplemental seal lip at a third surface of said metal body different from said external surface and in working relation to said dynamic seal portion, and
   a covering of hardenable material on an exterior perimeter of said static seal portion capable of hardening under an increase in temperature, wherein the hardenable material is different than the elastomer of the static seal portion and comprises the following proportional makeup:
   5-20% acrylpolymer,
   0-10% PTFE, and
   65-95% water.

2. The seal element in accordance with claim 1, wherein the hardenable material is hardenable under the effects of temperature.

3. The seal element in accordance with claim 1, wherein the hardenable material is a glue.

4. The seal element in accordance with claim 1, wherein the hardenable material is a polymer glue.

5. The seal element in accordance with claim 1, wherein the hardenable material is comprised of polyurethane or polyacrylate.

6. The seal element in accordance with claim 1, including a radial wave seal ring having an external surface on which the static seal portion is affixed.

7. The seal element in accordance with claim 6, wherein the static seal portion is made in a profiled form.

8. The seal element in accordance with claim 1, wherein the hardenable material composition consists essentially of:
   10% acrylpolymer
   5% PTFE, and
   85% water.

9. The seal element in accordance with claim 1, wherein the metal body includes two sheets of metal.

10. The seal element in accordance with claim 1, including the static seal portion of elastomer having an external surface having a radial wave profile.

* * * * *